United States Patent
Huang et al.

(10) Patent No.: US 6,919,941 B2
(45) Date of Patent: Jul. 19, 2005

(54) BACKLIGHT MODULE HAVING A WIRE ENGAGING PORTION FOR REDUCING EXTERNAL STRESS AND A LIQUID CRYSTAL DISPLAY DEVICE HAVING A LAMP HOLDER FOR FACILITATING HEAT DISSIPATION

(75) Inventors: Yung Li Huang, Taoyuan (TW); Ching Kun Lai, Changhua (TW)

(73) Assignee: Hannstar Display Corp., Taipei (TW)

( * ) Notice: Subject to any disclaimer, the term of this patent is extended or adjusted under 35 U.S.C. 154(b) by 25 days.

(21) Appl. No.: 10/650,687

(22) Filed: Aug. 29, 2003

(65) Prior Publication Data
US 2004/0160546 A1 Aug. 19, 2004

(30) Foreign Application Priority Data

Feb. 14, 2003 (TW) ...................................... 92202555 U

(51) Int. Cl.$^7$ ............................................ G02F 1/1333
(52) U.S. Cl. ............................ 349/58; 349/59; 349/65; 362/31
(58) Field of Search .............................. 349/58–65, 67, 349/70; 362/31

(56) References Cited

U.S. PATENT DOCUMENTS

| 5,375,005 | A | * | 12/1994 | Komano | 349/58 |
| 5,729,310 | A | * | 3/1998 | Horiuchi et al. | 349/62 |
| 6,587,166 | B1 | * | 7/2003 | Lee et al. | 349/58 |
| 6,667,780 | B2 | * | 12/2003 | Cho | 349/58 |
| 2002/0171784 | A1 | * | 11/2002 | Choi et al. | 349/58 |
| 2003/0016312 | A1 | * | 1/2003 | Park et al. | 349/58 |

FOREIGN PATENT DOCUMENTS

JP 08122775 A * 5/1996 ......... G02F/1/1335

* cited by examiner

*Primary Examiner*—Andrew Schechter

(57) ABSTRACT

A backlight module mainly includes a housing and a lamp. The lamp is disposed in the housing and includes two conductive terminals extending from two ends of the lamp and each connected with one of two wires. The present invention is characterized in that the backlight module has an engaging portion provided on the housing for fastening the two wires such that any external stress to which the wires are subjected can be transmitted to the engaging portion rather than concentrates in the joints between the wires and the conductive terminals of the lamp. The present invention further provides a liquid crystal display device utilizing the backlight module.

17 Claims, 6 Drawing Sheets

BACKLIGHT MODULE HAVING A WIRE ENGAGING PORTION FOR REDUCING EXTERNAL STRESS AND A LIQUID CRYSTAL DISPLAY DEVICE HAVING A LAMP HOLDER FOR FACILITATING HEAT DISSIPATION

BACKGROUND OF THE INVENTION

1. Field of the Invention

The present invention relates to a liquid crystal display device and the backlight module thereof.

2. Description of the Related Art

Generally, a liquid crystal display includes a liquid crystal panel which has two substrates and a liquid crystal layer interposed therebetween, and an illuminating device such as a backlight module which is disposed behind the liquid crystal panel. The backlight module is configured to distribute a light from a light source uniformly over the surface of the liquid crystal panel.

One of the most commonly used lamps in the backlight module of the liquid crystal display device is a Cold Cathode Fluorescent Lamp (CCFL). Generally, such kind of lamp has electrodes enclosed therein, and conductive terminals extending outwardly from the internal electrodes for connecting with external wires which are connected to the power so as to light up the lamp.

Generally, the conductive terminals of the cold cathode fluorescent lamp are connected with the external wires by soldering or copper strip. The joints between the conductive terminals of the cold cathode fluorescent lamp and the external wires tend to be separated when the external wires are subjected to external stress due to pulling or dragging of the wires. In addition, the aforementioned stress may be transmitted to the lamp thereby causing the lamp to break.

FIG. 1 shows a liquid crystal display device 100 including a backlight module with a lamp (not shown) disposed in the housing 101 thereof. As shown, the wires 106 connected with the lamp extend outwardly from the housing 101 and connect with a connector 108 which, in turn, connects with a power (not shown). Conventionally, a fixing tape is utilized to securely attach the wires 106 to the housing 101 of the liquid crystal device 100 in order to cope with the above problem thereby preventing the lamp itself or the joints between the conductive terminals and the wires from being affected by the external stress. However, this significantly increases the component cost and the manufacturing steps of the liquid crystal display device and prolongs the cycle time for manufacturing the device.

There is another problem found in the conventional liquid crystal display device: the heat generated from a lamp which is radiating light is not dissipated properly such that the light guide plate adjacent to the lamp often melts during operation since the light guide plate is made of polymers which are not resistant to high temperatures.

SUMMARY OF THE INVENTION

Therefore, it is an object of the present invention to provide a backlight module for a liquid crystal display device, wherein the backlight module is characterized by having a novel engaging portion to facilitate fastening the wires which are connected to the lamp of the backlight such that any external stress to which the wires are subjected can be transmitted to the engaging portion rather than concentrates in the joints between the wires and the conductive terminals of the lamp thereby overcoming, or at least reducing the above-mentioned problems of the prior art.

Furthermore, it is another object of the present invention to provide a liquid crystal display device having a novel lamp holder to facilitate dissipating the heat generated from the lamp which is radiating light in the backlight module.

According to the present invention, the backlight module mainly includes a housing and a lamp. The lamp is disposed in the housing and includes two conductive terminals extending outwardly from two ends of the lamp. Two wires are respectively connected with the conductive terminals. The present invention is characterized in that the backlight module has a engaging portion provided on the housing for fastening the two wires such that any external stress to which the wires are subjected can be transmitted to the engaging portion rather than concentrates in the joints between the wires and the conductive terminals of the lamp. It is preferred that the engaging portion is disposed at a position close to one of the two conductive terminals of the lamp but away from the connector.

According to one embodiment of the present invention, the engaging portion includes an L-shaped hook such that each of the wires makes a U-shaped turn when engaged with the L-shaped hook.

According to another embodiment of the present invention, the engaging portion includes a U-shaped groove such that each of the wires makes a U-shaped turn when engaged with the U-shaped groove.

The backlight module of the present invention may further include a novel lamp holder having a bottom portion and a bending portion extending from the bottom portion for receiving the lamp. The bottom portion of the lamp holder has two opposing side edges respectively corresponding to the two conductive terminals of the lamp, and two fastening portions respectively extending from the two opposing side edges of the bottom portion of the lamp holder for engaging the housing. According to one embodiment of the present invention, the housing and the fastening portion of the lamp holders are respectively provided with at least one interengaging portion for fastening the lamp holder to the housing. The interengaging portion of the housing includes a protrusion, and the interengaging portion of the fastening portion of the lamp holder includes an opening formed at a position corresponding to the protrusion of the housing.

The present invention further provides a liquid crystal display device mainly including a backlight module with a lamp, a liquid crystal panel, an upper housing, a lower housing and a lamp holder. The lower housing is used for receiving the backlight module, and the liquid crystal panel is disposed on the backlight module. The upper housing has a display window for accommodating a display region of the liquid crystal panel. The lower housing can be engaged with the upper housing thereby forming the liquid crystal display device. Furthermore, in the aforementioned liquid crystal display device, the lamp holder has another feature that the fastening portions of the lamp holder are respectively sandwiched between the upper housing and the lower housing and directly contact the upper housing The upper housing and the lamp holder are preferably made of highly thermal conductive material such as metal such that the heat dissipating efficiency of the liquid crystal display device can be enhanced by increasing the contact area between the upper housing and the lamp holder through providing the lamp holder with the fastening portions.

Other objects, advantages, and novel features of the invention will become more apparent from the following

DETAILED DESCRIPTION OF THE PREFERRED EMBODIMENT

Figure 1:
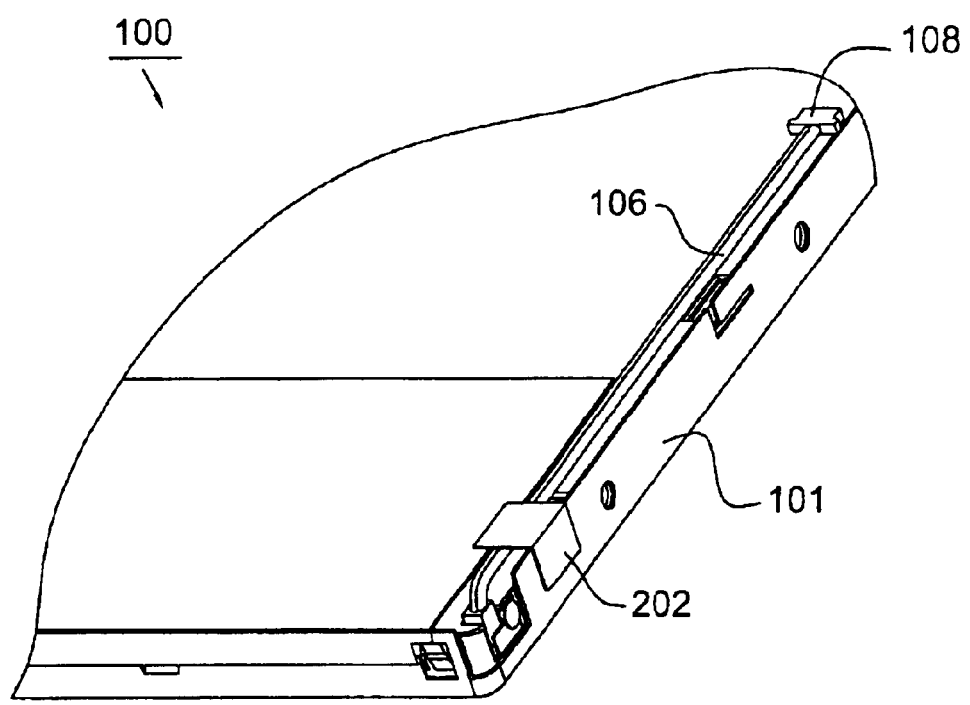
FIG. 1 is a perspective view of a portion of a conventional liquid crystal display device.
Figure 2:
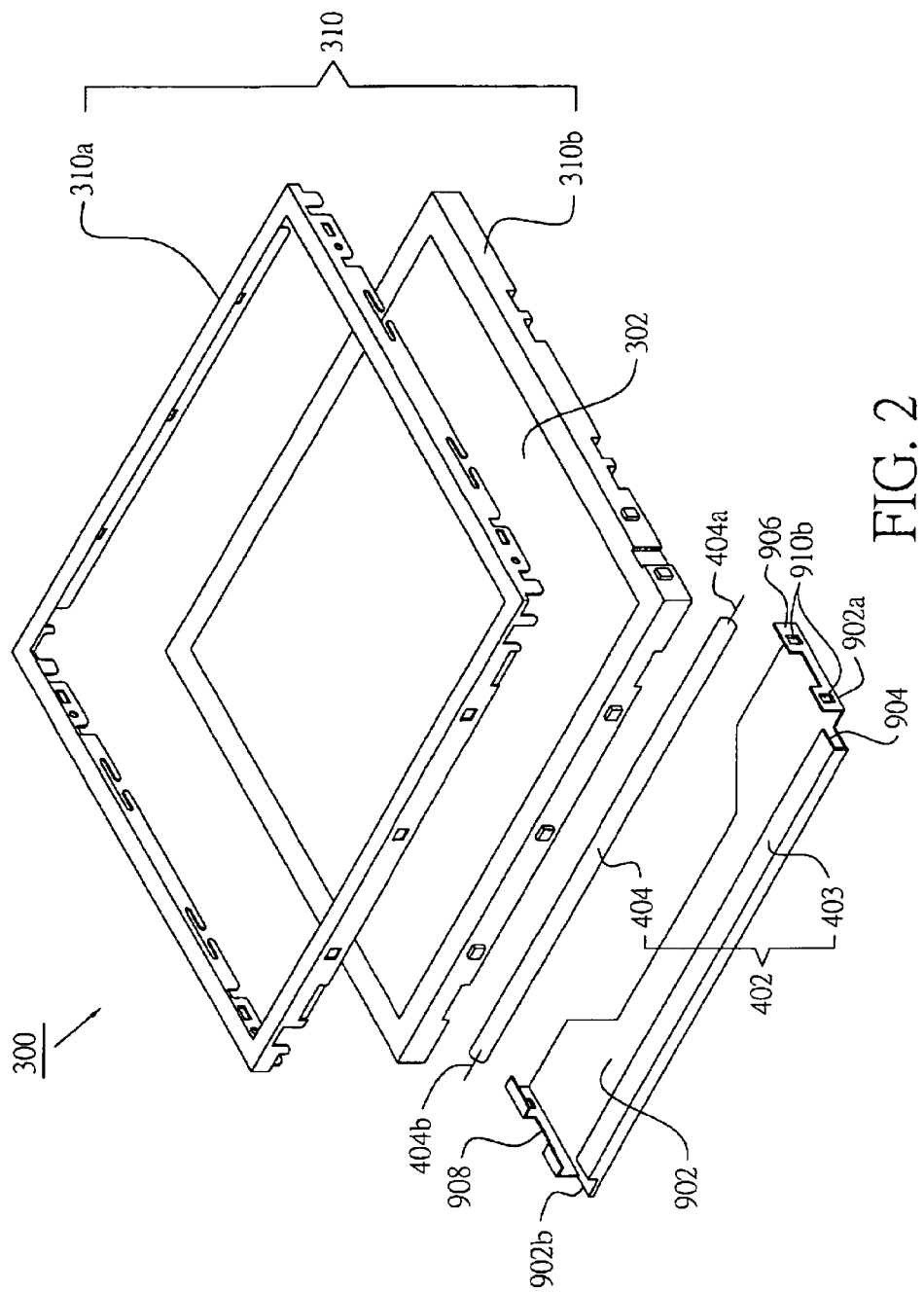
FIG. 2 is an exploded perspective view of a liquid crystal display device according to one embodiment of the present invention.

FIG. 2 illustrates a liquid crystal display device 300 according to one embodiment of the present invention. The liquid crystal display device 300 mainly includes a liquid crystal panel 302 for displaying images and a backlight module 402 for illuminating the liquid crystal panel 302.

The backlight module 402 includes a lamp 404 (serving) as a light source, a reflector (not shown), a light guide plate (not shown), an optical film (not shown) and a lamp holder 403. The backlight module 402 is configured to distribute the light emitted from the lamp evenly over the surface of the liquid crystal panel 302.

The liquid crystal display device 300 has a housing 310 including an upper housing (also called "frame") 310a and a lower housing 310b. The lower housing 310b is typically made of plastic material and used for receiving the backlight module 402. The lamp 404 of the backlight module 402 is secured to one side of the lower housing 310b by means of the lamp holder 403. The liquid crystal panel 302 and the backlight module 402 can be assembled into the liquid crystal display device 300 by coupling the upper housing 310a (generally made of metal) to the lower housing 310b. The upper housing 310a has a display window corresponding to the display region of the liquid crystal panel 302 and four sides surrounding the lower housing 310b.

Figure 3:
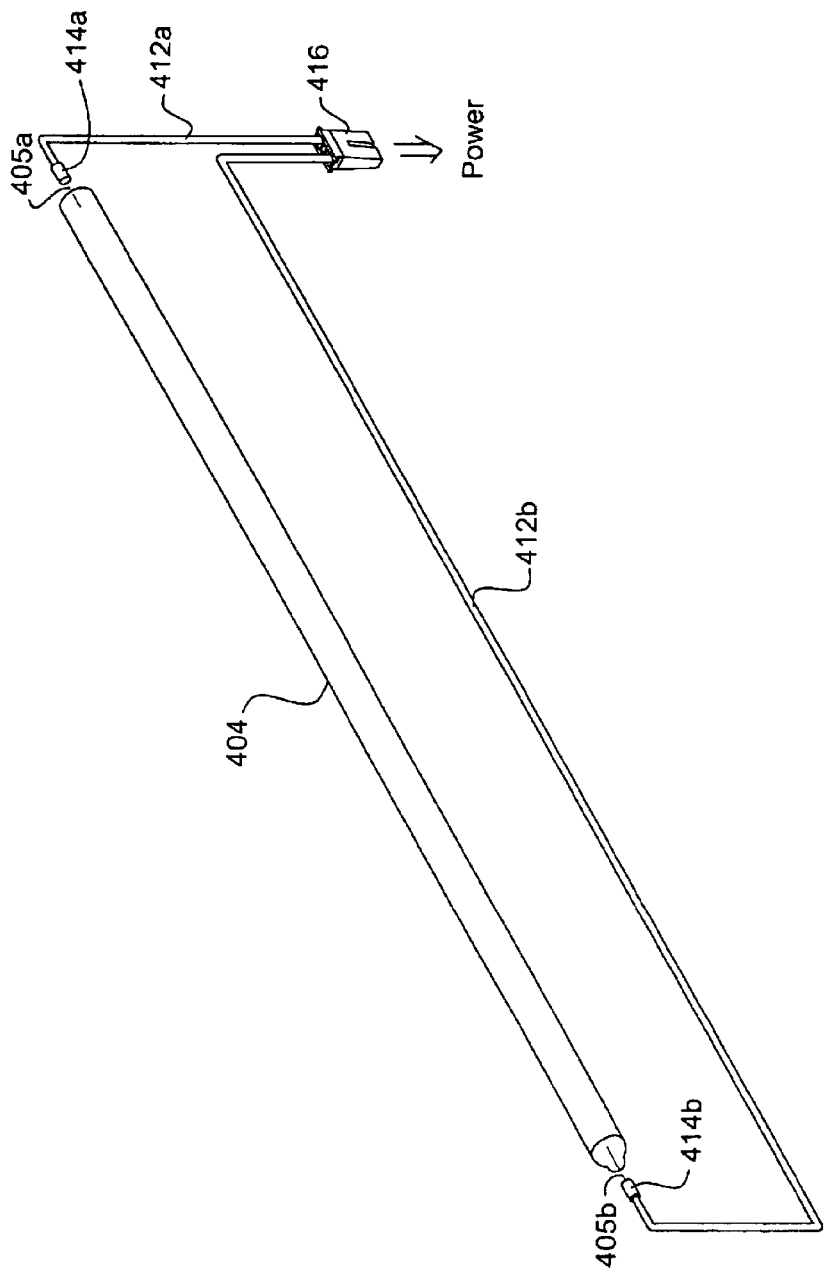
FIG. 3 is a schematic diagram showing a lamp connected with wires according to one embodiment of the present invention.

Referring to FIG. 3, the lamp 404 includes two conductive terminals 405a and 405b extending outwardly from two ends of the lamp, respectively. The conductive terminal 405a of the lamp 404 is connected with a wire 412a and a joint 414a is formed therebetween. The conductive terminal 405b of the lamp 404 is connected with another wire 412b and another joint 414b is formed therebetween. One ends of the two wires 412a and 412b are respectively connected with the conductive terminals 405a and 405b; and the other ends of the two wires 412a and 412b are connected to a connector 416. The connector 416 is adapted to be connected to a power connector (not shown) electrically connected to a power. The user may pull or drag the wires 412a and 412b when trying to connect the connector 416 to the power connector (not shown) thereby resulting in external stress on the joints 414a and 414b which, in turn, causes the wires 412a and 412b to be separated from the conductive terminals 405a and 405b of the lamp 404. In addition, the aforementioned stress may be transmitted to the lamp 404 thereby causing the lamp 404 to break.

Figure 4:
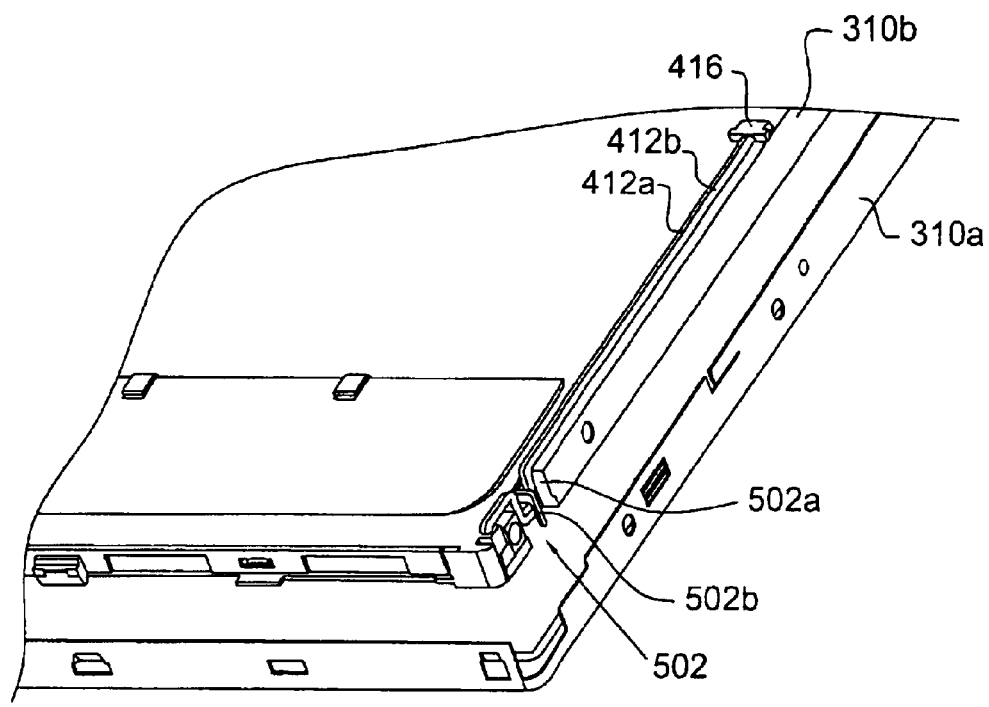
FIG. 4 is a perspective view of a portion of a liquid crystal display device according to another embodiment of the present invention showing an engaging portion provided on the housing of the liquid crystal display device.

Referring to FIG. 4, the lower housing 310b according to the present invention has an engaging portion 502 provided on the side of the lower housing 310b so as to resolve the aforementioned problem. The engaging portion 502 includes a cavity 502a and an L-shaped hook 502b for fastening the two wires 412a and 412b. Specifically, the cavity 502a of the engaging portion 502 is configured for receiving the wires 412a and 412b, and each of the wires 412a and 412b makes a U-shaped turn around when engaged with the L-shaped hook 502b. Therefore, any external stress to which the wires 412a and 412b are subjected can be transmitted to the engaging portion 502 rather than to the joints 414a and 414b or the lamp 404 (see FIG. 3).

Figure 5:
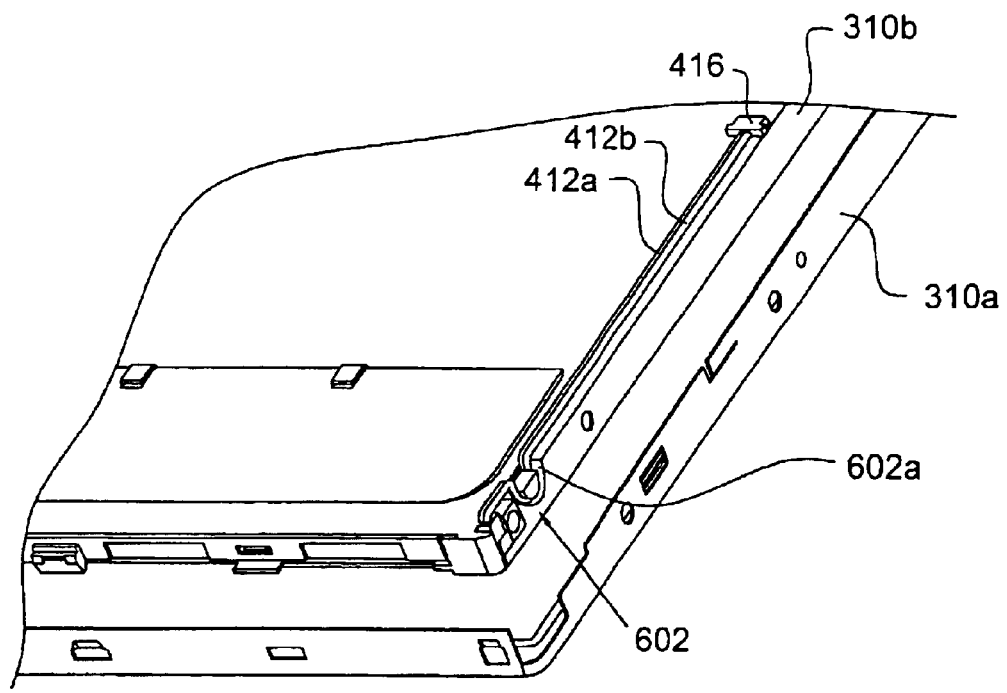
FIG. 5 is a perspective view of a portion of a liquid crystal display device according to still another embodiment of the present invention showing another engaging portion provided on the housing of the liquid crystal display device.

Referring to FIGS. 3 and 4, in this embodiment, wires 412a and 412b are brought together at one end portion of the lamp and extend outwardly from the lower housing 310b at a location nearby the end portion. It is preferred that the engaging portion 502 is disposed at a position close to the end portion of the lamp but away from the connector 416 thereby the connector 416 and the power connector can be assembled easily. FIG. 5 illustrates another embodiment of the present invention. As shown, the engaging portion 602 is illustrated as a U-shaped groove 602a formed in the lower housing 310b such that each of the wires 412a and 412b makes a U-shaped turn when engaged with the U-shaped groove 602a.

Another feature of the present invention is the provision of a novel lamp holder 403. As shown in FIG. 2, the lamp holder 403 has a bottom portion 902 and a bending portion 904 extending from the bottom portion 902. The bending portion 904 is adapted for receiving the lamp 404 and making the light from the lamp 404 concentrically emit from the opening of the bending portion 904. The lamp holder 403 is preferably made of metal to facilitate heat dissipation and fulfill the purpose of light condensation via light-reflection on the metal surface. The bottom portion 902 of the lamp holder 403 has two opposing side edges 902a and 902b respectively corresponding to the two end portions of the lamp 404. The lamp holder 403 has two fastening portions 906 and 908 respectively extending from the two side edges 902a and 902b of the bottom portion 902. In the liquid crystal display device 300 illustrated in FIGS. 6 and 7, each of the fastening portion 906 and the fastening portion 908 of the lamp holder 403 is sandwiched between the upper housing 310a and the lower housing 310b and directly contacts the upper housing 310a. Since the upper housing 310a and the lamp holder 403 are both made of metal, the heat generated by the lamp which is radiating light can be conducted to the upper housing 310a thereby improving the heat-dissipation efficiency to protect the lamp 404 (see FIG. 2) and the light guide plate (not shown). In another aspect, because the ground terminal of the lamp 404 can be connected to the lamp holder 403, the lamp 404 can be grounded through the contact between the upper housing 310a and the lamp holder 403. Furthermore, it is preferred that the lower housing 310b and the fastening portions 906 and 908 of the lamp holder 403 respectively have a plurality of interengaging portions 910 (see FIG. 7) for fastening the lamp holder 403 to the lower housing 310b. According to one embodiment of the present invention, the interengaging portion of the lower housing 310b includes a protrusion 910a (see FIG. 7), and the interengaging portion of the lamp holder 403 includes an opening 910b (see FIG. 2) disposed at the position corresponding to the protrusion 910a of the lower housing 310b.

Figure 6:
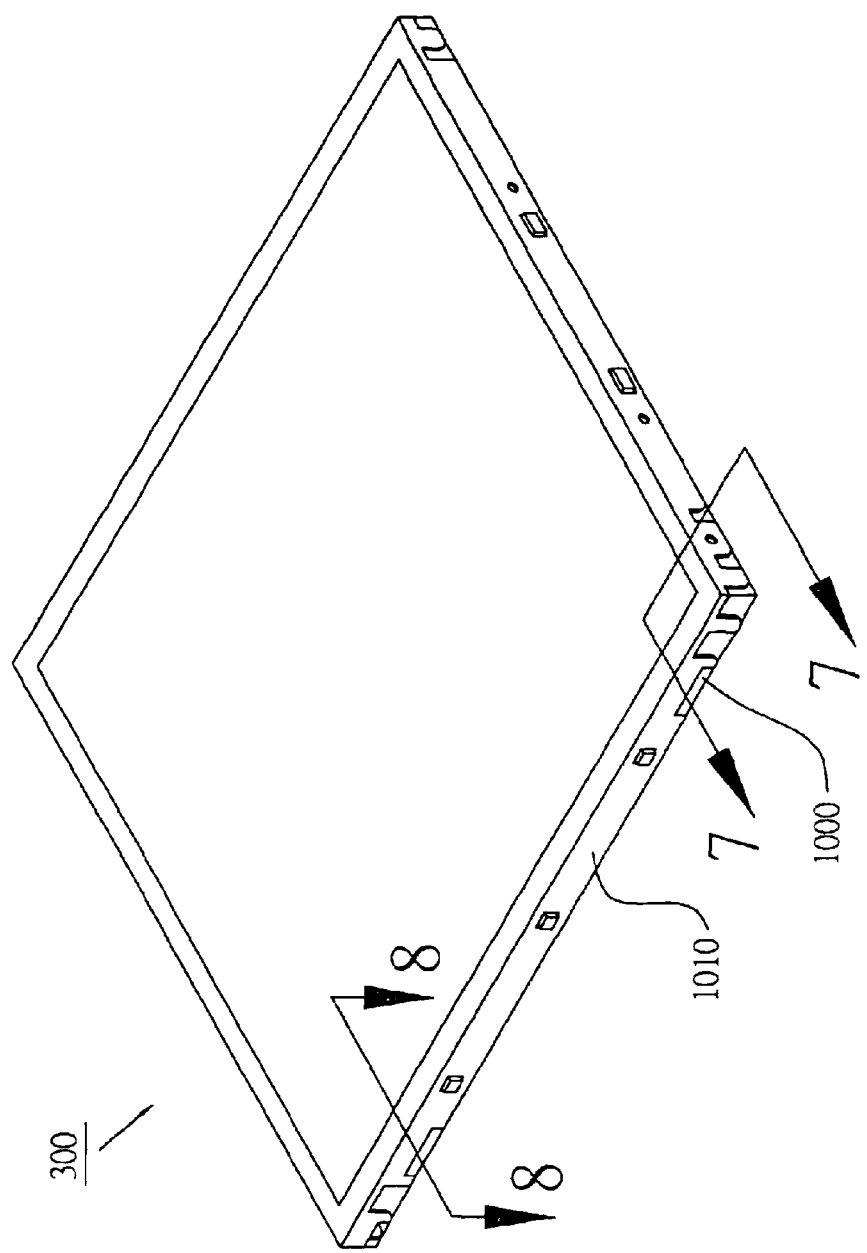
FIG. 6 is a perspective view of the liquid crystal display device of FIG. 2.
Figure 7:
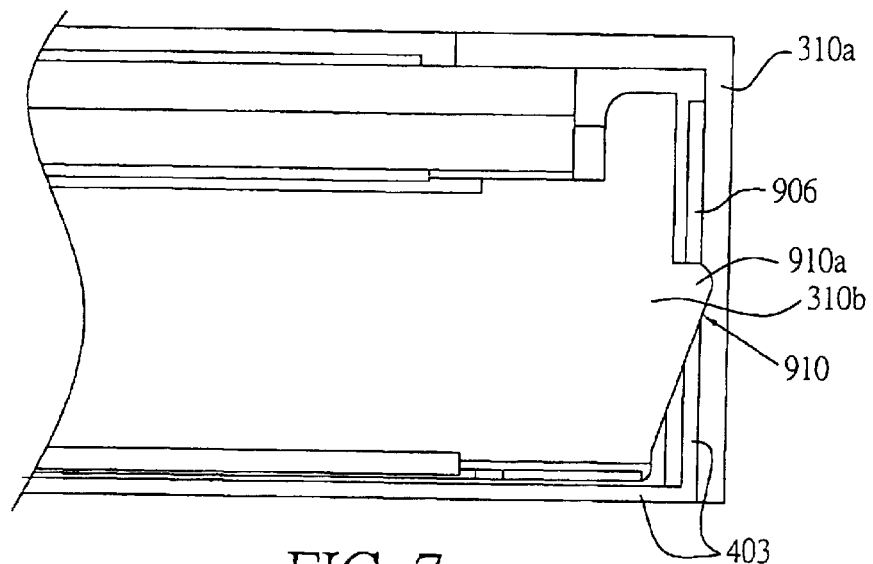
FIG. 7 is a cross-sectional view taken along line 7—7 of FIG. 6.
Figure 8:
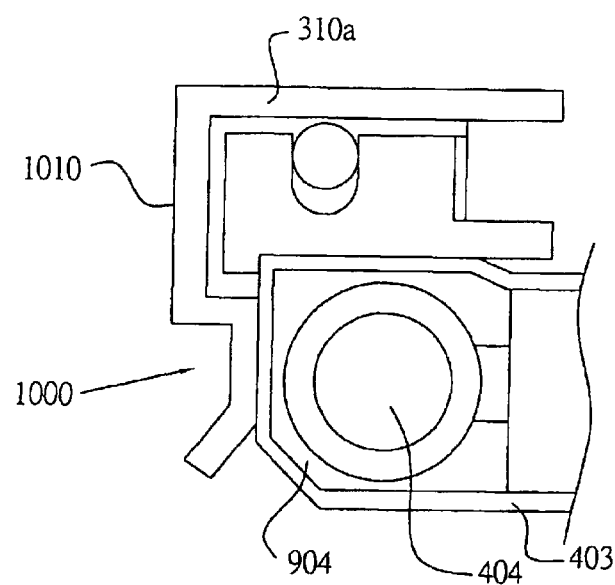
FIG. 8 is a cross-sectional view taken along line 8—8 of FIG. 6.

The present invention further provides a structure for heat dissipation. Referring to FIGS. 6 and 8, the upper housing 310a has a concave portion 1000 directly contacting the bending portion 904 of the lamp holder 403 thereby increasing the contact area between the upper housing 310a and the lamp holder 403 to facilitate heat dissipation. Specifically, the concave portion 1000 is disposed on the side 1010 of the upper housing 310a parallel to the lamp 404.

Although the invention has been explained in relation to its preferred embodiment, it is to be understood that many other possible modifications and variations can be made without departing from the spirit and scope of the invention as hereinafter claimed.

What is claimed is:

1. A backlight module, comprising:
   a housing;
   a lamp disposed in the housing, the lamp comprising at least two conductive terminals;
   each of the conductive terminals being connected with one of two wires; and
   an engaging portion provided on the housing for fastening the two wires such that any external stress to which the wires are subjected can be transmitted to the engaging portion rather than being concentrated in the joints between the wires and the conductive terminals of the lamp;
   wherein the engaging portion comprises a U-shaved groove such that each of the wires makes a U-shaped turn when engaged with the U-shaved groove.

2. The backlight module as claimed in claim 1, wherein each of the two wires has one end connected to a connector adapted to be electrically connected to a power connector, and the engaging portion is disposed at a position close to one of the two conductive terminals of the lamp but away from the connector.

3. The backlight module as claimed in claim 1, further comprising a lamp holder having a bottom portion and a bending portion extending from the bottom portion for receiving the lamp, and the bottom portion having two opposing side edges respectively corresponding to the two conductive terminals of the lamp.

4. The backlight module as claimed in claim 1, wherein the lamp holder further comprises two fastening portions respectively extending from the two opposing edges of the bottom portion of the lamp holder for engaging the housing.

5. The backlight module as claimed in claim 4, wherein the housing and the fastening portions of the lamp holder are respectively provided with at least one interengaging portion for fastening the lamp holder to the housing.

6. The backlight module as claimed in claim 5, wherein the interengaging portion of the housing comprises a protrusion, and the interengaging portion of the fastening portion of the lamp holder comprises an opening formed at a location corresponding to the protrusion of the interengaging portion of the housing.

7. A liquid crystal display device comprising:
   a backlight module comprising a lamp with at least two conductive terminals;
   a liquid crystal panel disposed on the backlight module;
   an upper housing having a display window for accommodating a display region of the liquid crystal panel;
   a lower housing for receiving the backlight module and engaging the upper housing;
   a lamp holder having a bottom portion and a bending portion extending from the bottom portion for receiving the lamp, the bottom portion having two opposing side edges respectively corresponding to the two conductive terminals of the lamp,
   wherein the lamp holder comprises two fastening portions respectively extending from the two opposing side edges of the bottom portion of the lamp holder for engaging the lower housing, and the fastening portions of the lamp holder are respectively sandwiched between the upper housing and the lower housing and directly contact the upper housing.

8. The liquid crystal display device as claimed in claim 7, wherein the lower housing and the fastening portions of the lamp holder are respectively provided with at least one interengaging portion for fastening the lamp holder to the lower housing.

9. The liquid crystal display device as claimed in claim 8, wherein the interengaging portion of the lower housing comprises a protrusion, and the interengaging portion of the fastening portion of the lamp holder comprises an opening formed at a location corresponding to the protrusion of the interengaging portion of the lower housing.

10. The liquid crystal display device as claimed in claim 7, wherein the upper housing and the lamp holder are made of metal, and the upper housing has a concave portion directly contacting the bending portion of the lamp holder.

11. The liquid crystal display device as claimed in claim 10, wherein the concave portion of the upper housing is formed on the side of the upper housing parallel to the lamp.

12. The liquid crystal display device as claimed in claim 7, farther comprising two wires respectively connected with the conductive terminals of the lamp, and an engaging portion provided on the lower housing for fastening the two wires such that any external stress to which the wires are subjected can be transmitted to the engaging portion rather than concentrates in the joints between the wires and the conductive terminals of the lamp.

13. The liquid crystal display device as claimed in claim 12, wherein the engaging portion comprises an L-shaped book such that each of the wires makes a U-shaped turn when engaged with the L-shaped hook.

14. The liquid crystal display device as claimed in claim 12, wherein the engaging portion comprises a U-shaped groove such that each of the wires makes a U-shaped turn when engaged with the U-shaped groove.

15. The liquid crystal display device as claimed in claim 12, wherein each of the two wires has one end connected to a connector adapted to be electrically connected to a power connector, and the engaging portion is disposed at a position close to one of the two conductive terminals of the lamp but away from the connector.

16. The liquid crystal display device as claimed in claim 15, wherein the engaging portion comprises mi L-shaped hook such that each of the wires makes a U-shaped turn when engaged with the L-shaped hook.

17. The liquid crystal display device as claimed in claim 15, wherein the engaging portion comprises a U-shaped groove such that each of the wires makes a U-shaped turn when engaged with the U-shaped groove.

* * * * *